United States Patent
Cha et al.

(10) Patent No.: US 7,933,938 B2
(45) Date of Patent: Apr. 26, 2011

(54) FILE STORAGE SYSTEM, FILE STORING METHOD AND FILE SEARCHING METHOD THEREIN

(75) Inventors: Myung Hoon Cha, Daejeon (KR); Hong Yeon Kim, Daejeon (KR); June Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 717 days.

(21) Appl. No.: 11/860,652

(22) Filed: Sep. 25, 2007

(65) Prior Publication Data
US 2008/0082525 A1   Apr. 3, 2008

(30) Foreign Application Priority Data
Sep. 29, 2006   (KR) .................. 10-2006-0096562

(51) Int. Cl.
*G06F 12/00* (2006.01)
(52) U.S. Cl. ...................................... 707/823; 707/827
(58) Field of Classification Search ............... 707/823, 707/827
See application file for complete search history.

(56) References Cited

U.S. PATENT DOCUMENTS

| | | | |
|---|---|---|---|
| 5,956,745 A | 9/1999 | Bradford et al. | |
| 6,880,102 B1 | 4/2005 | Bridge | |
| 2006/0206543 A1* | 9/2006 | Nishino et al. | 707/203 |
| 2007/0127070 A1* | 6/2007 | Murakami | 358/1.16 |

FOREIGN PATENT DOCUMENTS

| | | |
|---|---|---|
| KR | 1020020016551 A | 3/2002 |
| KR | 100359423 B1 | 10/2002 |
| KR | 1020040045166 A | 6/2004 |
| KR | 1020040056308 A | 6/2004 |
| KR | 1020060010607 A | 2/2006 |

* cited by examiner

*Primary Examiner* — Shahid A Alam
*Assistant Examiner* — Donald Lawson
(74) *Attorney, Agent, or Firm* — Ladas & Parry LLP (57) ABSTRACT

A file storage system, a file storing method, and a file searching method. In the file storing method, a single file to be stored is classified into at least one or more objects, and the classified objects are classified into pages with a serial number. One storage device to record the file is selected among a plurality of storage devices connected through a network. One object is allocated to the selected storage device. Pages configuring the file of the object allocated to the selected storage device are stored. When all pages of the file are not stored, the remaining pages are stored by allocating new object to a new storage device. Metadata for managing information about the storage of the file is set. Accordingly, the file can be stored over several disks. In addition, the overall system performance can be increased by setting the file information in the object metadata simply using the least resources.

12 Claims, 5 Drawing Sheets

FILE STORAGE SYSTEM, FILE STORING METHOD AND FILE SEARCHING METHOD THEREIN

CLAIM OF PRIORITY

This application claims the benefit of Korean Patent Application No. 10-2006-0096562 filed on Sep. 29, 2006 in the Korean Intellectual Property Office, the disclosure of which is incorporated herein by reference.

BACKGROUND OF THE INVENTION

1. Field of the Invention

The present invention relates to a file storage system, a file storing method and a file searching method therein and, more particularly, to a file storage system connected to a network, a method for storing a file overflowing a capacity of a single storage, and a method for searching a stored file in the file storage system.

This work was supported by the IT R&D program of MIC/IITA [2005-S-405-02, A Development of the Next Generation Internet Server Technology]

2. Description of the Related Art

Examples of storages for storing files include disks, diskettes, compact disks (CDs), and so on. Hard disk is widely used to store a large amount of data. Generally, a single disk is built in a computer. However, as an amount of data increases, several disks connected through a network are used. Especially, an intelligent disk having a separate memory and a separate operation unit in each disk can be used as data storage.

When several disks connected through the network are used, a single file is stored in one of the disks. In such an environment, space where a single file is stored is limited by the size of the initially selected disk. That is, it is impossible to create a file overflowing the size of the initially selected disk for storing the file.

In order to store the single file in several disks, the file is divided into several sections and the sections are stored in the several disks. Information about the sections can be stored in a bitmap format. However, this method may store the sections at random locations, not a continuous space, depending on operations of the operating systems. As a result, input/output performance may be degraded. According to the method of storing the information in the bitmap format, the file storage range is limited by the number of sections that can be expressed. As the file size increases, storage space where the information about the sections is stored will be used excessively.

A conventional method for managing a file storage system containing multiple data storage devices is disclosed in U.S. Pat. No. 6,880,102 B1, invented by William Bridge, filed by Oracle International Corporation on May 29, 2002, registered on Apr. 12, 2005. In this patent, data storage space is abstracted based on logical volumes, and the logical volumes are managed based on extents. Especially, a physical disk drive is divided into several partitions and one logical volume is comprised of one or more partitions. This method can be efficiently applied to data mirroring and redundant data storage using parity such as RAIDS. In addition, several disks are divided into a plurality of failure groups and a plurality of mirror partners so that, when problems occur, recovery probability of the stored files is increased and several files are not simultaneously influenced by a single error. In this way, stable data management can be achieved in such a situation that the storage devices are divided.

Another processing method is proposed to cope with a case where the storage space is insufficient in a drive disk corresponding to a mirrored partner of a certain disk drive.

In case that the disk drive selected to redundantly store a primary extent has no sufficient space for next extents, the extent storing the primary extent is deallocated and a new disk drive is selected to allocate the primary extent.

Such a technique is disclosed in the method for allocating the mirrored extent sets. However, a case where a space is insufficient while storing a file is not disclosed.

As another related art, a method for automatically resizing a disk drive volume is disclosed in U.S. Pat. No. 5,956,745, invented by Ted Kelly Bradford, filed by Novell, Inc on Apr. 23, 1997, registered on Sep. 21, 1999. In this patent, fragmentation problem is eliminated by resizing a volume block with respect to a volume storing data under an environment where one or more disk drives exist. In such a related art, volumes, volume blocks configuring the volume, and various tables storing their information are introduced. Information about the existing volumes are acquired and analyzed, and previously stored files are moved and stored according to a newly modified volume block size. Then, a volume state is reset according to the new volume block size. Specifically, at least one volume block must be allocated in order to store a single file. A file having a size smaller than the volume block size can be processed using a suballocation mechanism.

Therefore, if supported by the operating system, the storage space can be used efficiently by dividing a single volume block into a plurality of fragments such that files with a small size can be stored. The suballocation blocks may be contained in a single volume block. At this point, the size of several suballocation blocks may not be exactly equal to the size of the single volume block. The file can be stored over several suballocation blocks.

In the second method of the related art, however, as the size and number of the files increases, cost spent in managing the information increases because the data structure managing the blocks has the bitmap format.

SUMMARY OF THE INVENTION

The present invention has been made to solve the foregoing problems of the prior art and therefore an aspect of the present invention is to provide a file storage system having a plurality of storage devices connected through a network, a file storing method, and a file searching method, in which a single file is managed based on object and is stored in the plurality of storage devices.

Another aspect of the invention is to provide a file storage system, a file storing method, and a file searching method, in which a single file overflows a capacity of a storage device while it is being stored, the remaining contents of the file are continuously stored in other storage devices, thereby reducing burden on management of file storage capacity and file information.

According to an aspect of the invention, a file storing method of a file storage system includes: classifying a single file to be stored into at least one or more objects, and classifying the classified objects into pages with a serial number; selecting one storage device to record the file among a plurality of storage devices connected through a network; allocating one object to the selected storage device; storing pages configuring the file of the object allocated to the selected storage device; storing the remaining pages by allocating new object to a new storage device when all pages of the file are not stored; and setting metadata for managing information about the storage of the file.

According to another aspect of the invention, a file searching method of a file storage system includes: checking if a file to be stored is previously stored by using a file name in directory information of the file; when the file is previously stored, searching a storage device to store a page to be inputted/outputted by using a page number of the page to be inputted/outputted; and reading or modifying the file by transferring input/output signals to the searched storage device.

According to a further aspect of the present invention, a file storage system includes: a file generator for classifying a single file to be stored into at least one object, and classifying the object into pages with a serial number; a plurality of storage devices, connected through a network and to which the at least one object is allocated, for storing the pages configuring the file of the allocated object; a controller for selecting one storage device to record the file among the plurality of storage devices and allocating one object to the selected storage device; and a file storage information manager for setting metadata of a file for managing information about storage of the file.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

A file storage system according to the present invention is achieved under an environment where a plurality of storage devices are connected through a network. The storage devices in the file storage system may be implemented using various media, including hard disks, intelligent disks, object storage devices (OSDs), and so on. These media will be referred to as a disk.

Hereinafter, a configuration of the file storage system for storing a single file in a plurality of disks according to embodiments of the present invention will be described in detail with reference to the accompanying drawings.

Figure 1:
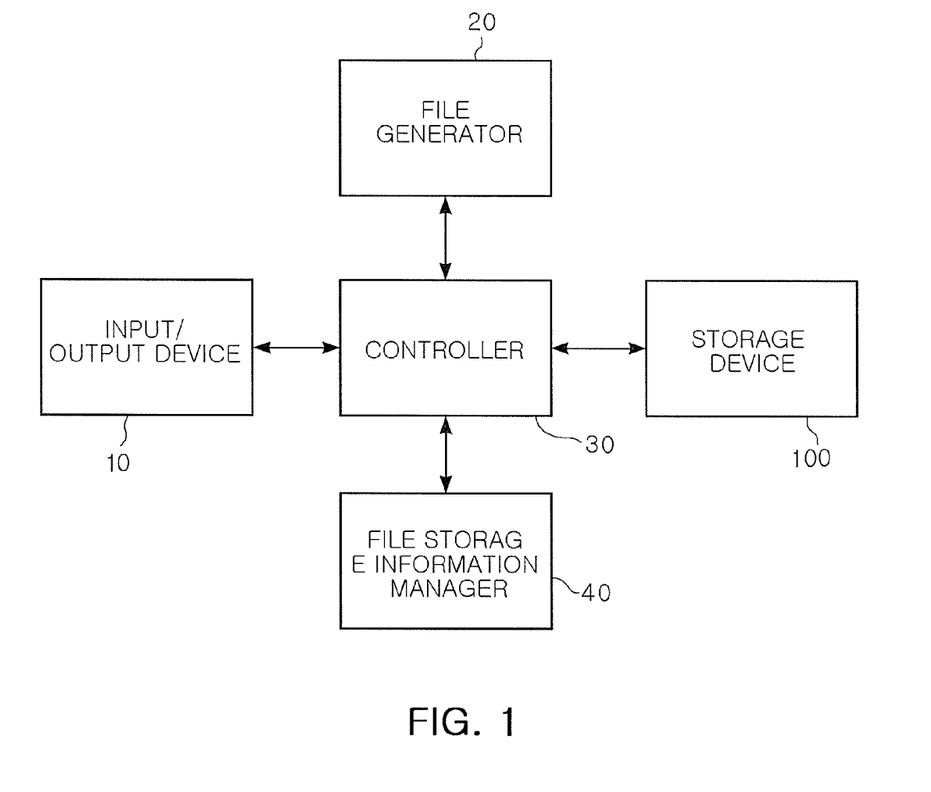
FIG. 1 illustrates a configuration of a file storage system according to an embodiment of the present invention.
Figure 2:
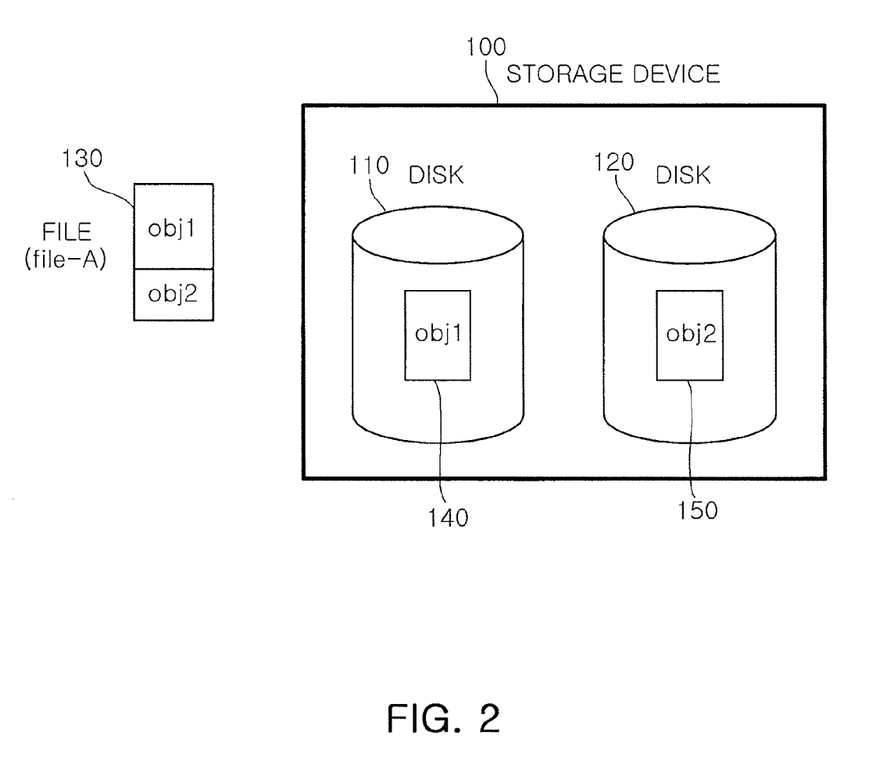
FIG. 2 is a block diagram of a storage device to which one object is allocated in each disk in the file storage system according to an embodiment of the present invention.

FIG. 1 illustrates a configuration of a file storage system according to an embodiment of the present invention, and FIG. 2 is a block diagram of a storage device to which one object is allocated in each disk in the file storage system of FIG. 1.

Referring to FIGS. 1 and 2, the file storage system includes a storage device 100 having a plurality of disks 110 and 120, an input/output device 10, a file generator 20, a controller 30, and a file storage information manager 40.

The file generator 20 classifies a single file into at least one or more objects and classifies the objects into pages having a serial number. In this way, the file generator 20 configures the file in a storable format.

The controller 30 selects one of a plurality of storage devices connected through a network and allocates one object to the selected storage device. When the selected storage device does not store all pages of the file, the controller 30 allocates a new object to a new storage device. In searching a previously stored file, the controller 30 searches a disk, where a page to be inputted/outputted is stored, by using a page number of the page to be inputted/outputted. Then, the controller 30 controls a file read operation or a file modify operation by transferring input/output signals to the searched disk.

The file storage information manager 40 sets metadata for managing information about storage of the file. The information about the metadata of the file will be described in detailed with reference to FIG. 3.

The storage device 100 includes a plurality of disks. The disks store the files on an object basis. The files being stored are configured with at least one or more objects. One object is stored in one disk. The size of the object is not fixed, and the objects of the single file have different sizes from one another.

For example, as illustrated in FIG. 2, when a file (file-A) 130 to be stored is divided into two objects, the first object 140 and the second object 150 are stored in the first disk 110 and the second disk 120, respectively. Although two disks are illustrated in FIG. 1 for convenience of explanation, it should be noted that the number of the disks can increase.

Each of the objects 140 and 150 is configured on a page basis. The page is a minimum allocation unit of the file having a predefined size. One object includes at least one page. The object will be described below in detail with reference to FIG. 3.

Figure 3:
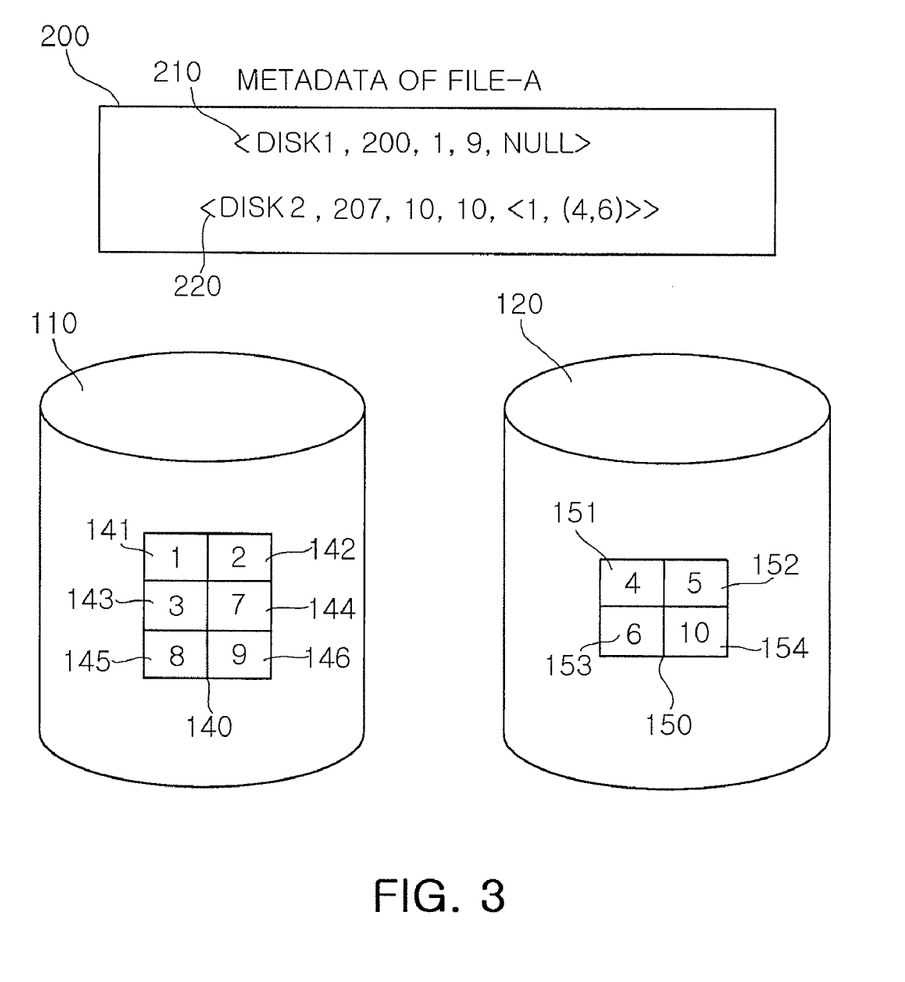
FIG. 3 illustrates a configuration of a file expression in the file storage system according to an embodiment of the present invention.

Referring to FIG. 3, the first object 140 is divided into six pages 141 to 146 and stored in the first disk 110, and the second object 150 is divided into four pages 151 to 154 and stored in the second disk 120.

The objects 140 and 150 are expressed in a metadata format of <disk ID, object ID, from_offset, to_offset, overflow> with respect to the file-A. The disk ID is an identifier of a disk storing a corresponding object, and the object ID is an identifier of the corresponding object. The from_offset is a lowest page number in the pages contained in the corresponding object, and the to_offset is a highest page number in the pages contained in the corresponding object. The overflow is a field for managing an overflow situation where an object recorded just before the corresponding object cannot record all pages.

In the metadata structure, hole may exist between the pages placed from the from_offset to the to_offset. Although hole may be contained in one object, information for identifying the hole is not maintained separately. That is, from_offset ~to_offset represent not the continuous space but the lowest page number and the highest page number in the pages contained in the object stored in a specific disk. For example, as illustrated in FIG. 3, when six pages 141 to 146 having the page numbers 1, 2, 3, 8 and 9 are contained in the first object 140 stored in the first disk 110, the metadata 210 of the first object 140 is expressed as <disk 1, 140, 1, 9, NULL>.

Furthermore, while pages of a file are being recorded in one selected disk 110, a capacity of the file may overflow the remaining capacity of the disk 110. For example, as illustrated in FIG. 3, when the file-A 130 has pages with page numbers 1-10, the pages 141 to 146 with page numbers 1, 2, 3, 7, 8 and 9 can be stored in the first disk 140. Thereafter, when the storage space of the first disk 140 is deficient, the pages 151 to 154 with page numbers 4, 5, 6 and 10 can be stored in the second disk 120. In this case, the pages 141 to 146 stored in the first disk 110 are managed as the first object 140, and the pages 151 to 154 stored in the second disk 120 are managed as the second object 150. The metadata 220 of the second object 150 is expressed as <disk 2, 150, 10, 10, <1, (4, 6)>>. The overflow field is expressed as (overflow_count, (from$_1$, to$_1$) (from$_2$, to$_2$), . . . , (from$_n$, to$_n$)) and manages the pages that are contained in the range from from_offset to to_offset of the object recorded in the previous disk but are not recorded in the previous disk according to operational characteristic of the operating system. These pages are recorded in a new disk which is selected later and to which a new object is allocated. Corresponding information is recorded in the overflow field of the new object. A range expressed as pair of (from$_i$, to$_i$) in the overflow field means the continuous page space.

As illustrated in FIG. 3, the pages 151 to 153 with page numbers 4, 5 and 6 are contained in a (1, 9) region, which is (from_offset, to_offset) in the metadata 210 of the first object 140, but they are not recorded in the first object 140. Therefore, the pages 151 to 153 are expressed in the overflow field of the metadata 220 of the second object 150. Because the page 154 with the page number 10 exceeds the range expressed by the first object 140, it is recorded in the from_offset field of the second object 150.

In such a file storage system, when a file to be recorded is received, the single file is stored over a plurality of disks according to the above-described file format. This file storing method will be described below in detail with reference to the accompanying drawings.

When the file storage system receives a file record command, it determines whether a corresponding file is a previously stored file or a new file by using a file name contained in directory information. A file storing method in case that the corresponding file is the new file will be described below.

Figure 4:
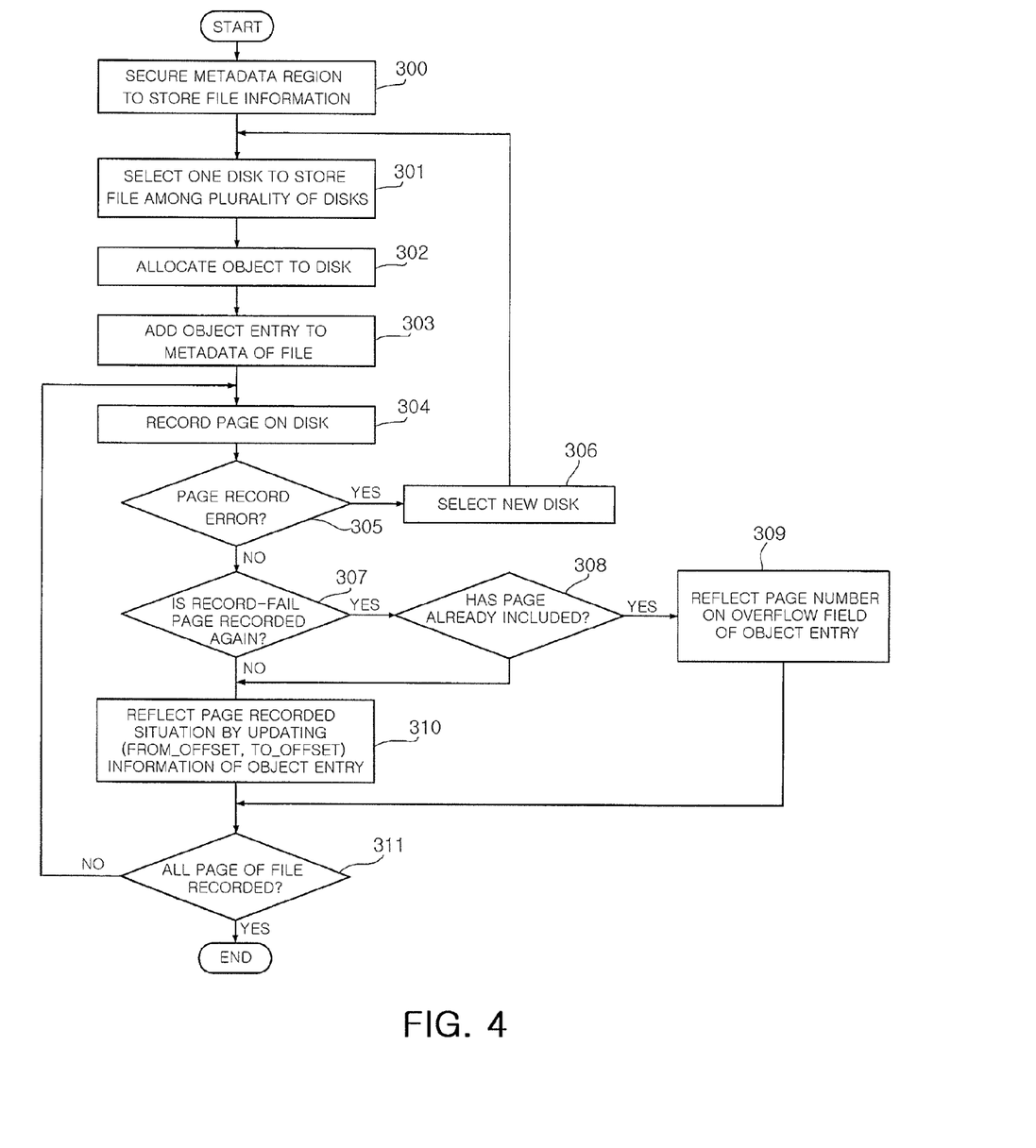
FIG. 4 is a flowchart illustrating a method for storing a new file in the file storage system according to an embodiment of the present invention.

FIG. 4 is a flowchart illustrating a method for storing a new file in the file storage system according to an embodiment of the present invention.

Referring to FIG. 4, the file storage system secures a metadata region to store file information in step 300. In step 301, the file storage system selects one disk to record the file among the plurality of disks connected through the network.

In step 302, the file storage system allocates an object to the selected disk. In step 303, the file storage system adds an object entry to the metadata of the file in order to manage the allocated object. In step 304, the file storage system records pages of the file in the selected disk. At this point, the pages may overflow the capacity of the selected disk. Therefore, in step 305, the file storage system determines if there occurs a page record error due to disk space deficiency.

When the page record error occurs, the file storage system selects a new disk in step 306 and returns to step 302 to allocate an empty object to the new disk.

On the other hand, when the page record error does not occur, the file storage system determines in step 307 whether to again record the pages that have failed to be recorded due to the disk space deficiency. When the pages are again recorded, the file storage system determines in step 308 if the page number is already included in the range of the previous object entry and the page number (from_offset, to_offset). When the page number is already included, the file storage system reflects the page number on the overflow field of the object entry in step 309 and proceeds to step 311. When the page number is not included, the file storage system proceeds to step 310.

On the other hand, when the pages are not again recorded in step 307, the file storage system updates object information contained in the recorded page and sets the (from_offset, to_offset) field of the object entry. For example, in case that the pages 141 to 145 with the page numbers 1, 2, 3, 7 and 8 are recorded in the metadata 210 of FIG. 2 so that the existing value of (from_offset, to_offset) is (1, 8), the value is updated with (1, 9) when the page 146 with the page number 9 is added.

In step 311, the file storage system determines if all pages contained in the file are recorded. When it is determined that all pages are recorded, the process is ended. On the other hand, when it is determined that all pages are not recorded, the file storage system returns to step 304 to record the pages in the disk. At this point, when the page to be recorded is the page 151 with the page number 4 and the disk 110 has no storage space, the value of (1, (4, 4)) is recorded in the overflow field of the metadata 220 for the new disk 120 like in step 306. Then, when the pages 152 and 153 with the page numbers 5 and 6 are recorded in the new disk 120, the value of the metadata 220 of the object 150 changes from <disk 2, 150, -, -, (1, (4, 4))> to <disk 2, 150, -, -, (1, (4, 5))> and <disk 2, 150, -, -, (1, (4, 6))>. When the last page 154 with the page number 10 is recorded, the value of the metadata 220 becomes <disk 2, 150, 10, 10, (1, (4, 6)).

Till now, the file storing method in case that the file to be stored is the new file has been described. Hereinafter, a file searching method in case that the file to be stored is already stored in the file storage system will be described.

When the file already stored in the file storage system is read or modified, the file storage system searches which disk the corresponding page is stored in using page numbers during input/output operations, finds identification number of the corresponding disk, and outputs input/output signals to the corresponding disk. The file searching method using the page number will be described below in detail.

Figure 5:
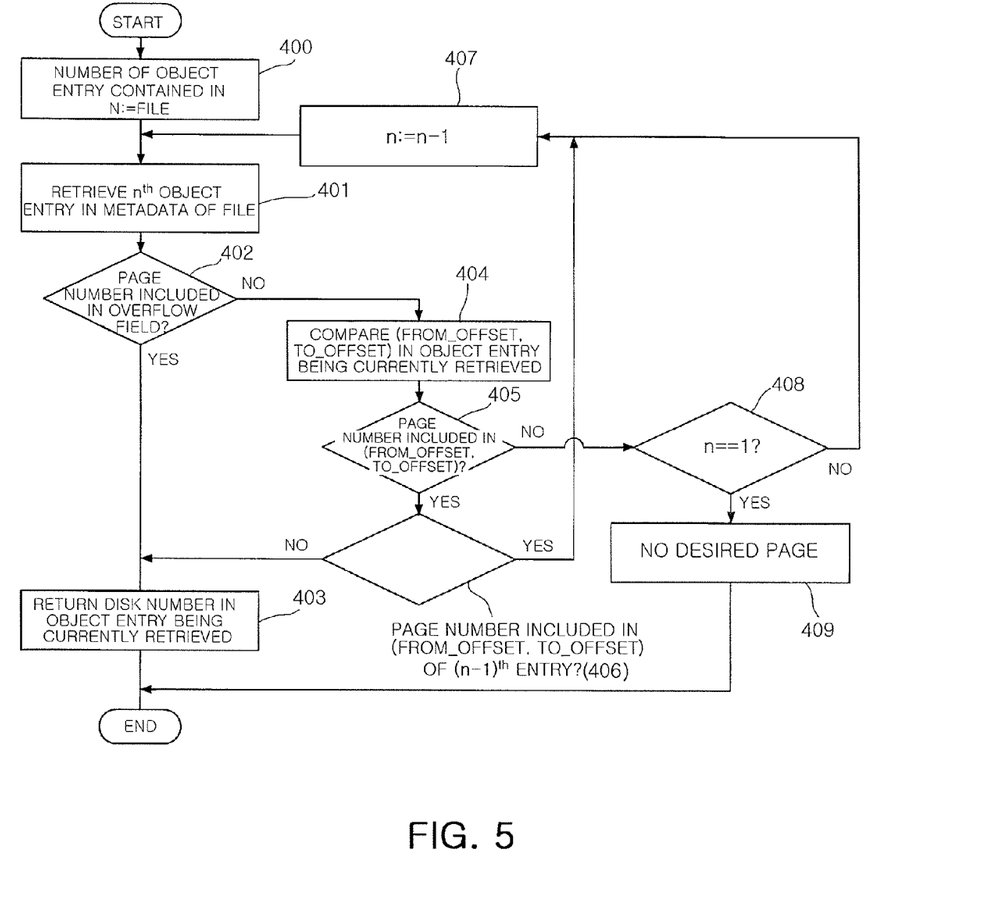
FIG. 5 is a flowchart illustrating a method for searching a storage device storing a page contained in a file in the file storage system according to an embodiment of the present invention.

FIG. 5 is a flowchart illustrating a method for searching a file storage device storing a page contained in a file in the file storage system according to an embodiment of the present invention.

Referring to FIGS. 2 and 5, the file storage system performs an initialization operation, for example an operation of setting the number (n) of object entries contained in the file in step 400.

In step 401, the file storage system retrieves an $n^{th}$ object entry from the metadata of the file. Specifically, the file storage system first retrieves the information about the latest object and finally retrieves the information about the oldest object, based on the management type of the object information stored in the metadata.

In step 402, the file storage system determines if the corresponding page number is included in the retrieved object entry, that is, the overflow field of the metadata of the object. When the corresponding page number is included in the retrieved object entry, the file storage system returns the disk number in the object entry being currently retrieved in step 403 and then finishes the process.

On the other hand, when the page number is not included in the retrieved object entry, the file storage system compares the page information (from_offset, to_offset) field within the object metadata in the object entry being currently retrieved in step 404, and determines if the page number is included in the page information (from_offset, to_offset) field in step 405. When the page number is included in the page information field, the file storage system determines if the page number is also included in the previous object entry, that is, the page information (from_offset, to_offset) field within the object metadata of (n−1)$^{th}$ entry. When the page number is also included in the previous object entry, the file storage system proceeds to step 407 to perform a setting operation for retrieving the previous object entry. That is, after setting n:=n−1, the file storage system returns to step 401. On the other hand, when the page number is not included, the file storage system returns to step 403.

When the page number is included in the page information field step 404, the file storage system determines in step 408 if it is n==1, that is, the current object entry is the last object entry to be retrieved. In step 409, when n is equal to 1, the file storage system reports that there is no desired page and then finishes the process. On the other hand, when n is not equal to 1, the file storage system returns to step 407 to perform a setting operation for retrieving the next object entry. Then, the file storage system performs the subsequent steps. In this way, the files storage system can retrieve a specific page even when a single file is stored in a plurality of distributed disks.

A case of retrieving the page with the page number 3, as illustrated in FIG. 3, will be described for explanatory purposes.

In step 401, when the latest object 150 is the metadata 220, the file storage system first retrieves the metadata 220, inspects the overflow field (1, (4, 6)), and determines if the page 143 with the page number 3 is included in the metadata 220. Because the page 143 with the page number 3 is not included in the metadata 220, the file storage system performs step 402.

In step 402, the file storage system compares the page information (from_offset, to_offset) field. Because from_offset and to_offset are set to "10" in the metadata 220, the file storage system can determine that the page 154 with the page number 10 is recorded in the disk 120. However, because the page 143 with the page number 3 is not included in the page information (from_offset, to_offset) field, the file storage system can determine that the desired page is not included in the object 150.

In steps 407 and 401, the file storage system reads information about the metadata 210 of the first object before the metadata 210 is recorded. In step 402, the file storage system retrieves the page 143 with the page number 3. As the retrieval result, because the page 143 with the page number 3 does not exist in the overflow NULL field, the file storage system determines if the page 143 is included in the page information (from_offset, to_offset) field in steps 403 and 404. Because the value in the page information field is (1, 9), the page 143 is included in the range of 1-9. Because the first object is the initially created object, the file storage system returns the number of the first disk 110 containing the first object instep 403, without performing the retrieving operation any more. Consequently, the file storage system can know that the desired page 143 is stored in the first disk 110.

According to the above-described embodiments, the single file is managed based on the object, and one object is stored in the single disk. A large-capacity file can be stored over several disks by managing the file as the object-based metadata.

In addition, even though the file size increase, the file information can be simply managed by retrieving the page information (from_offset, to_offset) field, the overflow field, and the object in a specific order. For example, when the number of the pages to be stored are 1, 2, 3, . . . , 1000000, all information can be expressed by only one entry (1, 1000000) in the page information (from_offset, to_offset) field of the metadata instead of storing all numbers of the pages in bitmap. Therefore, the metadata itself can be simplified, thereby increasing the overall system performance.

Moreover, even when the file to be recorded is not the new file but the previously stored file, the disk storing the file can be found much easier and faster by retrieving the pages within the object through the metadata set in a specific order.

As described above, the high-capacity file can be stored over several disks by managing the single file based on the object, storing one object in the single disk, and managing the file as the object-based metadata. In addition, the overall system performance can be increased by setting the file information in the object metadata simply using the least resources.

While the present invention has been shown and described in connection with the preferred embodiments, it will be apparent to those skilled in the art that modifications and variations can be made without departing from the spirit and scope of the invention as defined by the appended claims.

What is claimed is:

1. A file storing method of a file storage system, comprising:

classifying a single file to be stored into at least one or more objects;

classifying each of the at least one or more classified objects into pages, wherein the single file has at least three or more pages, wherein each of the pages are consecutively numbered with a non-repeating serial number;

selecting only one storage device to record the entire single file among a plurality of storage devices connected through a network;

allocating the one object having the at least two or more pages to the selected storage device;

storing the at least two or more pages of the file of the one object allocated to the selected storage device by referencing a smallest non-repeating serial number and a largest non-repeating serial number of the pages being stored, and wherein the stored at least two or more pages being stored in the one object are stored with the pages having the non-consecutive non-repeating numbers;

storing the remaining pages by allocating new object to a new storage device only after all of the pages of the single file are not stored; and setting metadata of the single file for managing information about the storage of the single file, wherein the setting metadata of the file for managing information comprises:

configuring the metadata of the file by adding metadata of the object allocated in each storage device storing the pages.

2. The file storing method according to claim 1, wherein the step of setting metadata of the file for managing information comprises:

setting fields representing information necessary to store the file in each storage device storing the pages; and updating information of the object containing the stored page with the metadata of the object, when the page is stored.

3. The file storing method according to claim 2, wherein the step of updating information of the object containing the stored page comprises:

when the page is stored in the selected storage device, setting the page number to be stored to a page information field within metadata of a first object added to the metadata of the file; and when all pages of the file are not stored, setting the remaining page numbers to a page information field within metadata of a second object added to the metadata of the file.

4. The file storing method according to claim 3, further comprising setting the page number to an overflow field within the metadata of the second object, when the page number is included in an expression range of the page information field within the metadata of the first object.

5. The file storing method according to claim 2, wherein the metadata of the object comprises a storage device information field (disk ID), an object information field (object ID), a page information field (from_offset, to_offset), and an overflow information field (overflow), the page information being classified by the smallest page number (from_offset) and the largest page number (to_offset) among the pages stored in one storage device.

6. The file storing method according to claim 5, wherein when the remaining pages of the file that are not recorded are included in the range of the page information, the overflow field expresses page information about the remaining pages as ((overflow_count), (from$_1$, to$_1$), (from$_2$, to$_2$), . . . , (from$_n$, to$_n$)).

7. A file storage system comprising:
  a file generator for classifying a single file to be stored into at least one object, and classifying the object into pages, wherein the single file has at least three or more pages, wherein each of the pages are consecutively numbered with a non-repeating serial number;
  a plurality of non-transitory computer readable recordable medium storage devices, connected through a network and to which the at least one object is allocated, for storing the at least two or more pages of the file of the allocated object;
  a controller having a processor for selecting one storage device by the processor to record the file among the plurality of storage devices and allocating one object to the selected storage device by referencing a smallest non-repeating serial number and a largest non-repeating serial number of the pages being stored, and
  wherein the stored at least two or more pages being stored in the object are stored with the pages having the non-consecutive non-repeating numbers, and
  wherein the controller allocates a new object to a new storage device only after all of the pages of the file are not stored; and
  a file storage information manager for setting metadata of a file for managing information about storage of the file, wherein the file storage information manager sets fields expressing storage information about a single file stored over a plurality of storage devices, the metadata containing metadata of objects as many as number of the storage devices storing the single file, the information about the object containing the stored page updating in the metadata of the file when a single page is stored.

8. The file storage system according to claim 7, wherein when the previously stored file is retrieved, the controller searches a storage device storing a page to be inputted/outputted by using the page number, and reads or modifies the file by transferring input/output signals to the searched storage device.

9. The file storage system according to claim 8, wherein the controller retrieves page numbers from a latest object entry to an oldest object entry in sequence, the page number being retrieved in an overflow field and a page field within metadata of a corresponding object entry.

10. The file storage system according to claim 7, wherein the file storage information manager sets the stored page number to a page information field within metadata of a first object when the page is stored in the selected storage device, and sets the remaining page numbers to a page information field within metadata of a second object when all pages of the file are not stored.

11. The file storage system according to claim 7 or 10, wherein the metadata of the object comprises a storage device information field (disk ID), an object information field (object ID), a page information field (from_offset, to_offset), and an overflow information field (overflow), the page information being classified by the smallest page number (from_offset) and the largest page number (to_offset) among the pages stored in one storage device.

12. The file storage system according to claim 11, wherein when the remaining pages of the file that are not recorded are included in the range of the page information, the overflow field expresses page information about the remaining pages as ((overflow_count), (from$_1$, to$_1$), (from$_2$, to$_2$), . . . , (from$_n$, to$_n$)).

* * * * *